United States Patent
Douglas

(10) Patent No.: US 7,635,517 B2
(45) Date of Patent: Dec. 22, 2009

(54) ANTISTATIC FABRICS AND PROTECTIVE DEVICE

(75) Inventor: Joel S. Douglas, Groton, CT (US)

(73) Assignee: Mystic MD, Inc., Groton, CT (US)

( * ) Notice: Subject to any disclaimer, the term of this patent is extended or adjusted under 35 U.S.C. 154(b) by 278 days.

(21) Appl. No.: 11/349,819

(22) Filed: Feb. 7, 2006

(65) Prior Publication Data
US 2006/0175581 A1 Aug. 10, 2006

Related U.S. Application Data

(60) Provisional application No. 60/652,111, filed on Feb. 10, 2005.

(51) Int. Cl.
*B32B 5/02* (2006.01)
(52) U.S. Cl. .................. 428/365; 428/357; 977/784; 977/734; 977/742; 977/961; 442/59; 442/110; 442/152
(58) Field of Classification Search ................ 442/110, 442/111, 59, 152; 977/778, 779, 784, 734, 977/742, 750, 752, 961; 428/357, 365
See application file for complete search history.

(56) References Cited

U.S. PATENT DOCUMENTS

| | | | | |
|---|---|---|---|---|
| 3,773,463 A | * | 11/1973 | Cohen et al. ................... | 8/495 |
| 3,955,022 A | | 5/1976 | Sands | |
| 4,127,565 A | * | 11/1978 | King et al. ................... | 528/283 |
| 4,557,968 A | | 12/1985 | Thorton et al. | |
| 4,661,116 A | * | 4/1987 | Barwick et al. ................ | 8/532 |
| 4,756,941 A | | 7/1988 | McCullough et al. | |
| 5,368,913 A | | 11/1994 | Ortega | |
| 6,558,767 B2 | * | 5/2003 | Yuan et al. ..................... | 428/58 |
| 6,656,388 B1 | | 12/2003 | Yang et al. | |
| 6,794,475 B1 | | 9/2004 | Bialke et al. | |
| 2004/0053552 A1 | * | 3/2004 | Child et al. .................. | 442/110 |

FOREIGN PATENT DOCUMENTS

JP  59217759 A  * 12/1984

* cited by examiner

*Primary Examiner*—D. Lawrence Tarazano
*Assistant Examiner*—Matthew D Matzek
(74) *Attorney, Agent, or Firm*—George Teacherson

(57) ABSTRACT

The invention includes fabrics that have been dyed or finished with a dye that contains a conductive mixture of conductive organic materials, inorganic materials, metals, metal oxides, carbon and carbon nanotubes or combinations or mixtures thereof. The dye is used to finish a fabric such that it is conductive. These fabrics are useful in shielding law enforcement personnel from energy weapons discharge and in providing an electrostatic medium for personnel that work with static sensitive products. The fabrics, when appropriately grounded, dissipate the emitted charge and transmit it to ground. Additionally, the apparel has high wear resistance and is both thermally and electrically conductive yet is comfortable to wear.

26 Claims, 1 Drawing Sheet

ANTISTATIC FABRICS AND PROTECTIVE DEVICE

CROSS REFERENCE TO RELATED APPLICATION

This application claims priority to U.S. Provisional Patent Application Ser. No. 60/652,111, the entire disclosure of which is hereby incorporated herein by reference in its entirety.

FIELD OF THE INVENTION

The present invention relates to fabrics and to processes for producing the fabrics, which are conductive both thermally and electrically. More specifically, the invention relates to fabrics having antistatic properties, which are useful as components in products requiring antistatic characteristics, such as floor coverings, dryer sheets, upholstery, medical fabrics, energy weapon dissipation armor and the like. Additionally these fabrics offer high conductive properties and increased wear resistance, possess increased lubricity and are resistant to mechanical degradation due to friction.

BACKGROUND OF THE INVENTION

Electrostatic charges can interfere with manufacturing processes, such as those used in the electronics industry where uncontrolled electrostatic discharge can result in the damage of products being manufactured. Additionally, manufacturing facilities which currently are prone to electrostatic damage of the products being made have developed comprehensive procedures, equipment and methods to combat the buildup and uncontrolled transfer of electrostatic charge. In addition the introduction of energy weapons as a means of incapacitating an individual has triggered the need for apparel formed from fabric that can transmit a high electrical charge. Additionally, law enforcement personnel and other individuals use electronic control devices (e.g., "stun guns" such as those made by and available from TASER of Scottsdale, Ariz. or similar devices), hereinafter referred to as "stun guns," to subdue individuals. The advent of individuals being allowed to buy stun gun technology results in a need for law enforcement personnel to have a means to counteract that threat. Therefore a means to protect both manufacturers from losses due to electrostatic discharge and law enforcement personnel from stun guns is needed. The solution to electrostatic discharge and energy weapon attacks requires that the materials used or worn are capable of dissipating a significant electrical charge to protect either personnel or product. Additionally many applications exist for a highly conductive three dimensional material such as a conductive fabric that has excellent lubricity and wear resistance. Examples of devices that could benefit from such a material are contact angular motion detectors or slides for measuring distance for use on equipment.

Prior techniques have addressed this problem by incorporating a small quantity of conductive fibers in the textile fiber material or the backing component of the fabric to act as a static dissipation element. For example, U.S. Pat. No. 4,756,941 to McCullough et al. discloses an electro-conductive tow or yarn made from continuous filaments or staple fiber yarns. The yarns are prepared from stabilized petroleum pitch, coal tar pitch or a synthetic fiber forming material which, on at least partial carbonization, is electro-conductive. The yarns are formed into coil-like fibers or filaments by winding the tow or yarn into a cloth, and heat treating the thus formed tow or yarn to a carbonizing temperature to set a coilure therein as well as electro-conductive properties thereto. McCullough et al. describe the use of a blend of nylon and conductive fibers to form a web which is then needle punched onto a polypropylene spun-bonded backing to give a conductive carpet.

U.S. Pat. No. 4,557,968 to Thornton, et al. describes a directional electrostatic dissipating fabric and method of making such fabric constructed of a woven or knitted base fabric having an integrally woven or knitted grid structure which is raised above only one surface of the base fabric forming a fabric with a raised grid on one side and a smooth or substantially smooth grid on the other side thereby resulting in increased, directional electrostatic dissipation performance from the side having the raised grid. The grid is formed from an electro-conductive yarn plied to a carrier yarn which is then integrally woven or knitted into the fabric in the warp direction, the fill direction or both, thereby producing a fabric which exhibits the rapid, yet controlled, directional dissipation of static electricity into the air. Such fabric can be used for anti-static covering cloths, filtration media and the like; but is particularly adapted for use in anti-static garments and it is particularly comfortable when the smooth or substantially smooth surface is adjacent to the wearer and the raised surface is on the outside of the garment.

U.S. Pat. No. 5,368,913 to Ortega describes antistatic spun-bonded non-woven fabrics. The fabrics of the invention include a plurality of substantially continuous electrically nonconductive filaments formed of a thermoplastic polymer, a plurality of electrically conductive filaments distributed among the electrically nonconductive filaments throughout the fabric, and a multiplicity of discrete bond sites bonding together the electrically nonconductive and the electrically conductive filaments to form a coherent fabric.

U.S. Pat. No. 6,794,475 to Bialke, et al. describes antistatic polymers, blends, and articles. U.S. Pat. No. 3,955,022 to Sands describes a primary carpet backing comprising a woven or bonded non-woven sheet of continuous filaments having needled thereto a layer of a blend of staple fibers. The staple fibers include a synthetic organic polymeric fiber containing conductive carbon.

U.S. Pat. No. 6,656,388 to Yang, et al. describes a processable electrically conductive polymeric complex comprising a polyelectrolyte having acid functional groups and a conductive polymer. However, he states that electronic conductors are difficult to dye.

Despite these and other techniques for forming an antistatic fabric and conductive fabrics that are capable of carrying an electrical charge, a fabric having the ability to provide substantially uniform distribution of the conductive fibers throughout is desirable, so as to provide good electrical dissipation and transfer properties. This would in turn reduce the need for using antistatic chemicals, woven threads or other additives in the fabric to provide electrical conductivity. Further, it would be desirable to provide a fabric having conductive fibers which are an integral part of the article and not polymer based or specially woven with conductive fibers so that the article is comfortable to wear and provides excellent conductive properties. An added advantage would be to provide a fabric that has low coefficient of friction so that when used in applications where the fabric is in contact with mechanical sliding components the friction coefficient is not high.

SUMMARY OF THE INVENTION

The invention utilizes nano technology to create fabric for personal wear that is both comfortable and conductive. The fibers in the fabric or material create a highly conductive path for the electrostatic charge or stun gun electrical stimulus by providing a conductive medium for an electrical discharge. Thus, protective apparel made from conductive fabric transfers the electrical stimulus safely to ground or via an attached grounding conductor. The process of making the fabric conductive utilizes the existing dye and finishing processes normally used on fabrics. However the dyes of the invention have been made conductive by incorporating a conductive mixture of conductive organic materials, amorphous carbon, inorganic materials, metals, metal oxides, carbon and carbon nanotubes or combinations or mixtures thereof. The nanotubes are selected such that the diameter is less than 30 nanometers and more preferably less than 20 nanometers.

To accomplish the grounding of the electrical stimulus, dyes using nano size particles, carbon black, metals, metal oxides, conductive mixtures of conductive organic materials, inorganic materials, and carbon nanotubes or combinations or mixtures thereof are applied to fabric or threads that are woven into or are applied to the apparel, creating a highly conductive apparel item that is capable of breathing and is neither course nor stiff as are those articles made by processes described in the prior art. The apparel is both thermally and electrically conductive yet is comfortable to wear. It provides a surface with a low coefficient of friction because of the carbon attached to the fiber structure.

Depending on the application requirements, carbon nanotubes with metals can be chemically bound or incorporated into the carbon nanotubes which can then be utilized to make highly efficient conductive material which is suitable for the purpose of creating electrostatic apparel, conductive grips, conductive traces on mechanical components or stun gun armor system. The carbon nanotubes can also be chemically enhanced with metals to increase their conductivity and applied to the apparel or used as thread coating or dye.

The ability to form fibers or continuous fabrics that are capable of transferring large electrical charges is critical to applications requiring fabrics to provide either thermal or electrical conductivity.

In addition, these materials provide the wearer with an enhanced thermal conductivity apparel layer, which can be used to increase the removal of heat from a body wearing the apparel. This feature of the material can be useful in hot climates for a variety of applications.

In one aspect, the present invention is directed to electrical and thermally conductive fabrics which provide good conductive properties. The fabrics are formed by applying a dye formed from electrically and thermally conductive components and curing it so as to dye the fabric or threads and thereby impregnating the fibers with the conductive elements which impart the conductive properties onto the fabric and fibers that comprise the fabric. By doing so the fabric is transformed into a highly conductive barrier that is capable of transmitting both electricity and heat. By providing conductive properties to the fabric and the fibers that comprise the fabric, conductive elements are distributed uniformly throughout the fabric and the fabric maintains its original properties such as breath-ability or flexibility which is significantly different than the prior art. The added feature of a low coefficient of friction makes the material useful in non traditional areas such as in contract sensors were lubricity and resistance to frictional wear are important. The conductive components of the dye may be selected from the group consisting of carbon, metal oxides, metals, conductive mixtures of conductive organic materials, inorganic materials, and carbon nanotubes or combinations or mixtures thereof and preferably are part of a dye or polymer dye or finishing step. The nanotubes are selected such that the diameter is less than 30 nanometers and more preferably less than 20 nanometers. The dyes are made from conductive dispersions comprising of solvents which are selected from water, o-Xylene, o-Dichlorobebzene, acetone or alcohol. However, many solvents can be used to suspend the conductive material.

In one embodiment of this aspect of the invention, the conductive fabric is produced by applying a dye made from traditional dye constituents plus conductive elements selected from carbon, metal oxides, carbon nanotubes and metals. In this embodiment of the invention, the electrically conductive fibers formed from the dying and curing step are uniformly conductive. The fibers become conductive by coating them with nano size particles. Also, these particles can be applied to the apparel, in either case creating a highly conductive apparel item that is capable of breathing and is comfortable to wear.

In another embodiment of this aspect of the invention, the individual fibers are dyed or finished with the conductive dye and then the fabric is produced to form a conductive fabric. In this embodiment, electrically conductive filaments are woven to form the fabric.

In another aspect, this invention also relates to conductive dyes made from dispersions with a low solids concentration. The conductive dyes are used to form a conductive layer imbibed into the fabric made of carbon nanotubes and alloyed with other conductive and non conductive materials to achieve the desired results. The conductive and non conductive materials include carbon nanotubes, carbon nanotubes/antimony tin oxide, carbon nanotubes/platinum, carbon nanotubes and carbon, carbon nanotubes/silver or carbon nanotubes/silver-chloride and communicate electrically with conductive ink or conductive carbon nanotubes, carbon nanotubes/antimony tin oxide, carbon nanotubes/platinum, or carbon nanotubes/silver or carbon nanotubes/silver-chloride, antimony tin oxide, iridium tin oxide, aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and combinations and mixtures thereof. Also, a polymeric material can be added to the dye to provide additional properties such as water resistance. These polymers can be selected from the group consisting of polyethylene, polypropylene, polyvinyl chloride, styrenic compounds, polyurethane, polyimide, polycarbonate, polyethylene terephthalate, cellulose, gelatin, chitin, polypeptides, polysaccharides, polynucleotides and mixtures thereof, or ceramic hybrid polymers, Ethylene Glycol Monobutl Ether Acetate, phosphine oxides and chalcogenides.

In a preferred embodiment of this aspect, carbon nanotubes of this invention are comprised of straight and bent multi-walled nanotubes (MWNTs), straight and bent double-walled nanotubes (DWNTs) and straight and bent single-walled nanotubes (SWNT), and various compositions of these nanotube forms and common by-products contained in nanotube preparations such as described in U.S. Pat. No. 6,333,016, which is incorporated herein by reference in its entirety. The conductive organic materials can also be selected from the group consisting of buckeyballs, amorphous carbon, carbon, carbon black, fullerenes, nanotubes with an outer diameter of greater than about 0.5 nm, and combinations and mixtures thereof. The nanotubes are selected such that the diameter is less than 30 nanometers and more preferably less than 20 nanometers and the dyes are made from conductive dispersions comprising of solvents which are selected from water, o-Xylene, o-Dichlorobebzene, acetone or alcohol. However, many solvents can be used to suspend the conductive material.

The resultant fabric exhibits good conductive properties, thus eliminating the need for additional conductive agents. Further, the electrically conductive elements are securely bonded to the fibers of the fabric. The conductive fabrics are particularly useful as components in products which require static dissipation and /or high wear resistance such as floor coverings, upholstery, dryer sheets, medical fabrics, stun gun armor and the like. They also can be formed into a conductive layer of personnel armor to dissipate the charge of an energy weapon such as a stun gun when the apparel is properly grounded.

DETAILED DESCRIPTION OF THE INVENTION

Figure 1:
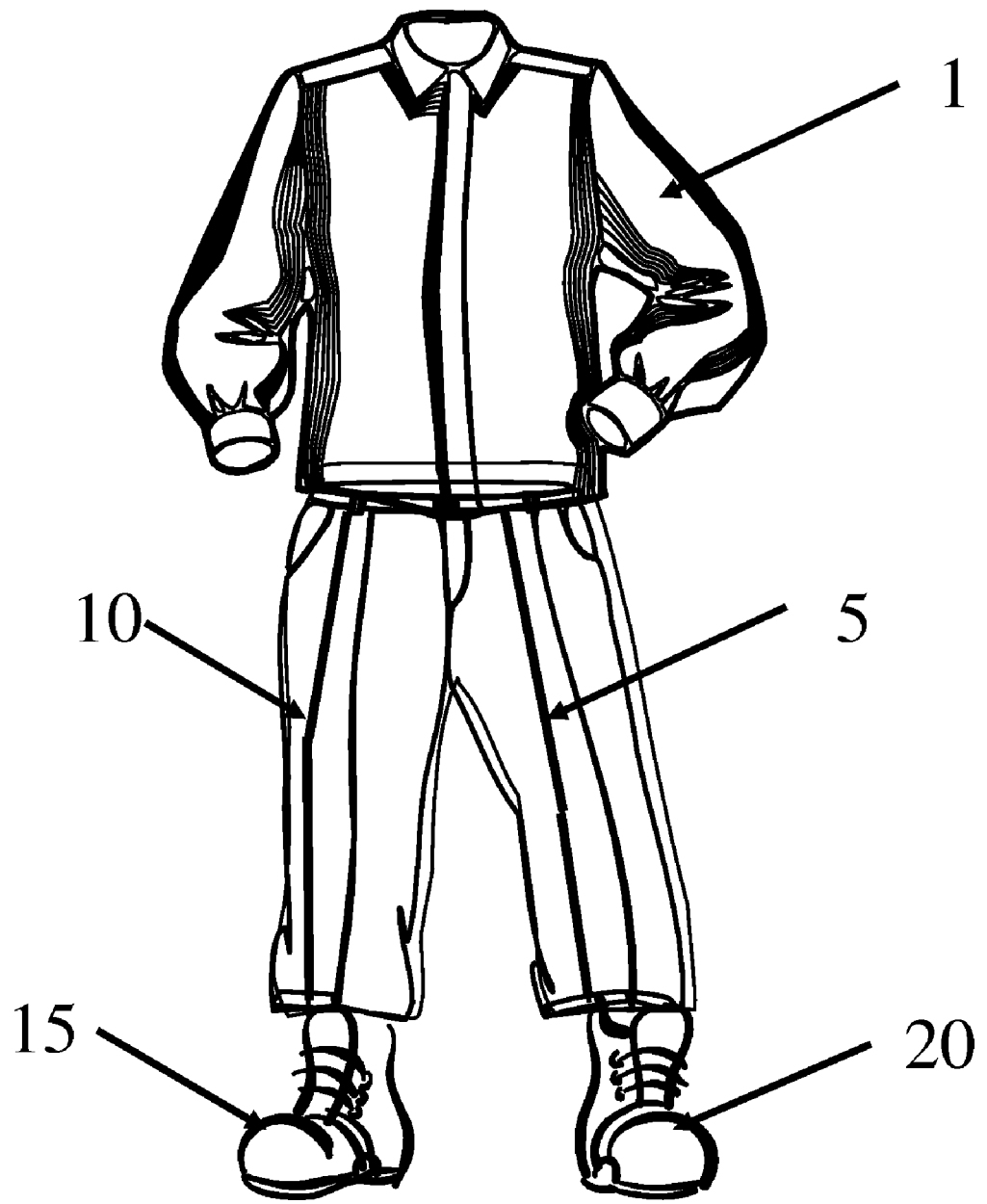
FIG. 1 is a view of one exemplary grounded fabric armor system in accordance with the present invention.

In the following detailed description of preferred embodiments of the invention, specific terms are used in describing the invention; however these are used in a descriptive sense only and not for the purpose of limitation. It will be apparent that the invention is susceptible to numerous variations and modifications within its scope.

Samples of conductive fabrics in accordance with the present invention were prepared as described below. The carbon nanotubes can either be chemically enhanced with metals to produce added conductivity if desired.

The dyes can be formed from the following processes. The first embodiment uses multiwalled carbon nanotubes (MWNT) or double walled carbon nanotubes (DWNT) to make a dye comprising a carbon nanotubes dispersion and a dye mixture to dye a linen fabric.

Step 1: A dispersion of carbon nanotubes is formed by taking 20 mg of MWNT or DWNT to 40 ml of o-Xylene (HPLC grade, purity 96%). The nanotubes are selected such that the diameter is less than 30 nanometers and more preferably less than 20 nanometers. Then sonicate the solution using an ultrasonic disintegrator. One exemplary ultrasonic disintegrator is a SANYO MSE SONIPREP 150, which is available from Sanyo North America Corporation, San Diego, Calif. The SANYO MSE SONIPREP 150 is tuned to 23 kH and using one-quarter power for 5-10 minutes. Then heat the solution to 80 C and sonicate it on high power for 30 minutes making sure that the o-Xylene level does not go below the 40 ml mark. If it does, then add more o-Xylene. Monitor the solvent temperature, remove it from the heat and the sonicator and let the solution cool down. The suspension has been created. The carbon nanotubes will remain in suspension.

Step 2: Add 0.85 grams of Acheson PF-407C which is a dispersion of conductive carbon and polymer to 1000 micro liters of the dispersion of carbon nanotubes from step 1 and sonicate this solution using a SANYO MSE SONIPREP 150 tuned to 23 kH and using one-quarter power for 5-10 minutes.

Step 3: The formulation of the indigo dye. The following ingredients were assembled:
10.5 g indigo powder
20.95 g washing soda
700 ml water
41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then the carbon nanotube and PF-407C dispersion from step 2 is then added to the dye mixture. After the color of the solution begins to turn brown, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, linen material was placed in the dye bath for 5 minutes and then carefully removed. Right after the material is removed from the dye bath, it is brown in color, but once exposed to the air it turns dark blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The second embodiment uses multiwalled carbon nanotubes (MWNT) or double walled carbon nanotubes (DWNT) to make a dye comprising a carbon nanotubes dispersion and a dye mixture to dye a linen fabric.

Step 1: A dispersion of carbon nanotubes is formed by taking 20 mg of MWNT or DWNT to 40 ml of o-Xylene (HPLC grade, purity 96%). The nanotubes are selected such that the diameter is less than 30 nanometers and more preferably less than 20 nanometers. Then sonicate the solution using a SANYO MSE SONIPREP 150 tuned to 23 kH and using one-quarter power for 5-10 minutes. Then heat the solution to 80 C and sonicate it on high power for 30 minutes making sure that the o-Xylene level does not go below the 40 ml mark. If it does, then add more o-Xylene. Monitor the solvent temperature, remove it from heat and the sonicator and let the solution cool down. The suspension has been created. The carbon nanotubes will remain in suspension.

Step 2: The formulation of the indigo dye. The following ingredients were assembled:
10.5 g indigo powder
20.95 g washing soda
700 ml water
41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then a premix of 40 ml of carbon nanotube dispersion from step 1 is then added 3 ml of distilled water which is then sonicated using a SANYO MSE SONIPREP 150 tuned to 23 kH and using one-quarter power for 5-10 minutes. The premix is added to the dye mixture so that it forms approximately 5% of the total volume of the dye mixture. After the color of the solution begins to turn yellowish-green, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, linen material was placed in the dye bath for 5 minutes and then carefully removed. Right after the material is removed from the dye bath, it is yellow-greenish in color, but once exposed to the air it turns blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The third embodiment uses single walled carbon nanotubes (SWNT) to make a dye comprising a carbon nanotubes dispersion and a dye mixture to dye a linen fabric.

Step 1: A mixture of carbon nanotubes is formed by adding 0.056 grams of single walledcarbon nanotubes selected from a group where the average diameter is less than 30 nanometers and more preferably less than 20 nm, added to 20 ml of o-Xylene (HPLC grade, purity 96%) and 20 ml of O-Dichlorobebzene. This mixture is sonicated using a SANYO MSE SONIPREP 150 tuned to 23 kH and using high power for 30 minutes making sure that the o-Xylene level does not go below the 40 ml mark. If it does, then add more Xylene. Monitor the solvent temperature, remove it from heat and the sonicator and let the solution cool down. The suspension has been created. The SWNT's will remain in suspension.

Do not allow the temperature of o-Xylene to exceed 100 C. Monitor the process closely and avoid inhaling the o-Xylene fumes when it is sonicating.

Step 2: The formulation of the indigo dye. The following ingredients were assembled:
  10.5 g indigo powder
  20.95 g washing soda
  700 ml water
  41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then 40 ml of carbon nanotube dispersion from step 1 is added to the dye mixture so that it forms approximately 5% of the total volume of the dye mixture. After the color of the solution begins to turn yellowish-green, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, the linen material was placed in the dye bath for 5 minutes and then removed carefully. Right after the material is removed from the dye bath, it is yellow-greenish in color, but once exposed to the air it turns blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The fourth embodiment uses single walled carbon nanotubes (SWNT) to make a dye comprising a carbon nanotubes dispersion and a dye mixture to dye a linen fabric.

Step 1: A mixture of carbon nanotubes is formed by adding 0.056 grams of single walled carbon nanotubes selected from a group where the average diameter is less than 30 nanometers and more preferably less than 20 nm, 0.056 grams of single walled nanotubes added to 20 ml of o-Xylene (HPLC grade, purity 96%) and 20 ml of O-Dichlorobebzene. This mixture is sonicated using a SANYO MSE SONIPREP 150 tuned to 23 kH and using high power for 30 minutes making sure that the o-Xylene level does not go below the 40 ml mark. If it does, then add more Xylene. Monitor the solvent temperature, remove it from heat and the sonicator and let the solution cool down. The suspension has been created. The SWNTs will remain in suspension.

Do not allow the temperature to exceed 100 C. Monitor the process closely and avoid inhaling the o-Xylene fumes when it is sonicating.

Step 2: Take 0.85 grams of Acheson PF-407C which is a dispersion of conductive carbon and polymer and then add to 1000 micro liters of the dispersion of carbon nanotubes from step 1. The solution is sonicated using a SANYO MSE SONIPREP 150 tuned to 23 kH and using one-quarter power for 5-10 minutes. The polymer component of the PF-407C provides for increased binding properties of the resulting dye. However, a polymeric material can be added to the dye to provide additional properties such as water resistance. These polymers can be selected from the group consisting of polyethylene, polypropylene, polyvinyl chloride, styrenic compounds, polyurethane, polyimide, polycarbonate, polyethylene terephthalate, cellulose, gelatin, chitin, polypeptides, polysaccharides, polynucleotides and mixtures thereof, or ceramic hybrid polymers, Ethylene Glycol Monobutl Ether Acetate, phosphine oxides and chalcogenides.

Step 3: The formulation of the indigo dye. The following ingredients were assembled:
  10.5 g indigo powder
  20.95 g washing soda
  700 ml water
  41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then the carbon nanotube and PF-407C dispersion from step 2 is added to the dye mixture. After the color of the solution begins to turn brown, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, the linen material is placed in the dye bath for 5 minutes and then removed carefully. Right after the material is removed from the dye bath, it is brown in color, but once exposed to the air it turns dark blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The fifth embodiment uses multiwalled carbon nanotubes (MWNT) or double walled carbon nanotubes (DWNT) to make a dye comprising a carbon nanotubes dispersion and a dye mixture to dye a linen fabric.

Step 1: A dispersion of carbon nanotubes is formed by taking 20 mg of MWNT or DWNT to 40 ml of o-Xylene (HPLC grade, purity 96%). The nanotubes are selected such that the diameter is less than 30 nanometers and more preferably less than 20 nanometers. Then sonicate the solution using a SANYO MSE SONIPREP 150 tuned to 23 kH and using one-quarter power for 5-10 minutes. Then heat the solution to 80 C and sonicate it on high power for 30 minutes making sure that the o-Xylene level does not go below the 40 ml mark. If it does, then add more o-Xylene. Monitor the solvent temperature, remove it from heat and the sonicator and let the solution cool down. The suspension has been created. The carbon nanotubes will remain in suspension.

Step 2: Then take 0.89 grams of Acheson Electrodag—PF 427, which is an Antimony tin Oxide polymer mix and then add to 1000 micro liters of the dispersion of carbon nanotubes from step 1. The solution is sonicated using a SANYO MSE SONIPREP 150 tuned to 23 kH and using one-quarter power for 5-10 minutes.

Step 3: The formulation of the indigo dye. The following ingredients were assembled:
  10.5 g indigo powder
  20.95 g washing soda
  700 ml water
  41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then add the carbon nanotube dispersion from step 2 to the dye mixture. After the color of the solution begins to turn yellowish-green, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, the linen material was placed in the dye bath for 5 minutes and then removed carefully. Right after the material is removed from the dye bath, it is yellow-greenish in color, but once exposed to the air it turns blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The sixth embodiment uses single walled carbon nanotubes (SWNT) to make a dye comprising a carbon nanotubes dispersion and a dye mixture to dye a linen fabric.

Step 1: A mixture of carbon nanotubes is formed by adding 0.056 grams of single walled carbon nanotubes, selected from a group where the average diameter is less than 30 nanometers and more preferably less than 20 nm, and functionalized with silver (but any conductive metal can be used) to 20 ml of o-Xylene (HPLC grade, purity 96%) and 20 ml of O-Dichlorobebzene. This mixture is sonicated it using a SANYO MSE SONIPREP 150 tuned to 23 kH and using high power for 30 minutes making sure that the o-Xylene level does not go below the 40 ml mark. If it does, then add more Xylene. Monitor the solvent temperature, remove it from heat and the sonicator and let the solution cool down. The suspension has been created. The SWNTs will remain in suspension.

Do not let the temperature go above 100 C. Monitor the process closely and avoid inhaling the o-Xylene fumes when it is sonicating.

Step 2: The formulation of the indigo dye. The following ingredients were assembled:
  10.5 g indigo powder
  20.95 g washing soda
  700 ml water
  41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then 40 ml of carbon nanotube dispersion from step 1 is added to the dye mixture so that it forms approximately 5% of the total volume of the dye mixture. After the color of the solution begins to turn yellowish-green, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, the linen material was placed in the dye bath for 5 minutes and then removed carefully. Right after the material is removed from the dye bath, it is yellow-greenish in color, but once exposed to the air it turns blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The seventh embodiment uses single walled carbon nanotubes (SWNT) to make a dye comprising a carbon nanotubes dispersion and a dye mixture to dye a linen fabric.

Step 1: A mixture of carbon nanotubes is formed by adding 0.056 grams of single walled carbon nanotubes, selected from a group where the average diameter is less than 20 nanometers and more preferably less than 10 nm, to 20 ml of o-Xylene (HPLC grade purity 96%), and 20 ml of O-Dichlorobebzene. Next add 0.004 grams of nano size platinum (e.g., from Sigma-Aldrich Company, item 483966, (platinum nanosize activated powder)). The dispersant can be formulated such that the percent weight of the metal is between 0.5% and 10%. The conductive inorganic materials can be selected from the group consisting of antimony tin oxide, iridium tin oxide, aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and combinations and mixtures thereof. Then add 1 ml of acetone and 1 ml of ethanol. The mixture is then sonicated using a SANYO MSE SONIPREP 150 tuned to 23 kH and using high power for 30 minutes making sure that the o-Xylene level does not go below the 40 ml mark. If it does, then add more Xylene. Monitor the solvent temperature, remove it from heat and the sonicator and let the solution cool down. The suspension has been created. The SWNTs will remain in suspension.

Do not let the temperature go above 100 C. Monitor the process closely and avoid inhaling the o-Xylene fumes when it is sonicating.

Step 2: The formulation of the indigo dye. The following ingredients were assembled:

10.5 g indigo powder
20.95 g washing soda
700 ml water
41.94 g sodium hydrosulfite.

The procedure for the preparation of this dye is as follows. First step is dissolving the indigo powder into a small amount of warm water in order to form a paste. In another beaker the washing soda is dissolved in water. After that half of the washing soda is gradually added to the indigo powder paste and stirred thoroughly. After an even mixture is attained, half of the sodium hydrosulfite is added and stirred again. Finally enough warm water is added to have 700 ml of solution and then the solution is heated to 130° F. (around 54° C.). Then 40 ml of the carbon nanotube dispersion from step 1 is added to the dye mixture so that it forms approximately 5% of the total volume of the dye mixture. After the color of the solution begins to turn yellowish-green, wait for 20 minutes and the rest of the sodium hydrosulfite is spread over the dye, to render harmless any dissolved oxygen. During the preparation of the dye and during the dyeing procedure, stir very carefully in order to keep oxygen from being dissolved into the solution. For the actual dyeing process, the linen material was placed in the dye bath for 5 minutes and then removed carefully. Right after the material is removed from the dye bath, it is yellow-greenish in color, but once exposed to the air it turns blue. Then allow the linen material to dry completely before rinsing with running water.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The eighth method is to form a black dye which is conductive. To accomplish this:

Step 1: A dispersion of carbon nanotubes is formed by taking 20 mg of Single wall (SWNT) MWNT or DWNT to 40 ml of o-Xylene (HPLC grade, purity 96%). The nanotubes are selected such that the diameter is less than 30 nanometers and more preferably less than 20 nanometers. Then sonicate the solution using an ultrasonic disintegrator. One exemplary ultrasonic disintegrator is a SANYO MSE SONIPREP 150, which is available from Sanyo North America Corporation, San Diego, Calif. The SANYO MSE SONIPREP 150 is tuned to 23 kH and using one-quarter power for 5-10 minutes. Then heat the solution to 80 C and sonicate it on high power for 30 minutes making sure that the o-Xylene level does not go below the 40 ml mark. If it does, then add more o-Xylene. Monitor the solvent temperature remove it from the heat and the sonicator and let the solution cool down. The suspension has been created. The carbon nanotubes will remain in suspension.

Step 2: Add 0.85 grams of Acheson PF-407C which is a dispersion of conductive carbon and polymer to 1000 micro liters of the dispersion of carbon nanotubes from step 1 and sonicate this solution using a SANYO MSE SONIPREP 150 tuned to 23 kH and using one-quarter power for 5-10 minutes.

Apply the above dispersion to applied to a linen panel and spread evenly over the complete panel. Alternatively the linen can be dipped coated by adding 1000 micro liters of acetone to the carbon nanotube dip and mixing with the SANYO MSE SONIPREP 150 tuned to 23 kH and using one-quarter power for 5-10 minutes and dipping the linen in the dispersion.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

The ninth method is to form a black dye which is conductive. To accomplish this:

Step 1: A dispersion of carbon nanotubes is formed by taking 20 mg of Single wall (SWNT) MWNT or DWNT to 40 ml of o-Xylene (HPLC grade, purity 96%). The nanotubes are selected such that the diameter is less than 30 nanometers and more preferably less than 20 nanometers. Then sonicate the solution using an ultrasonic disintegrator. One exemplary ultrasonic disintegrator is a SANYO MSE SONIPREP 150, which is available from Sanyo North America Corporation, San Diego, Calif. The SANYO MSE SONIPREP 150 is tuned to 23 kH and using one-quarter power for 5-10 minutes. Then heat the solution to 80 C and sonicate it on high power for 30 minutes making sure that the o-Xylene level does not go below the 40 ml mark. If it does, then add more o-Xylene. Monitor the solvent temperature, remove it from the heat and the sonicator and let the solution cool down. The suspension has been created. The carbon nanotubes will remain in suspension.

Step 2: Apply the above dispersion to applied to a linen panel and spread evenly over the complete panel. Alternatively the linen can be dipped coated by adding 1000 micro liters of acetone to the carbon nanotube dip and mixing with the SANYO MSE SONIPREP 150 tuned to 23 kH and using one-quarter power for 5-10 minutes and dipping the linen in the dispersion.

The linen panels are then cured to form the carbon nanotubes into a conductive mat that is integrated into the conductive dye formulation used to dye the fabric creating a conductive path in the linen panel formed by the dye. The samples were cured for 20 minutes at 95 degrees C. The carbon nanotubes, when mixed with the dye base and the mixture applied to the bibulous or absorbent fiber, preferentially adhere to the outer diameter of the fiber forming a conductive mat around the fiber, which is fixed after curing.

Tables 1 through 9 provide the results of a dye system modified to be conductive and the results when cured at different temperatures and curing times. As can be seen the curing time and curing temperature have a significant effect on the conductivity of the dye dispersion when printed on linen.

Thermal conductivity was measured in watts per meter per degree Kelvin. The coefficient of friction was measured as a static measurement using a 100 gram bronze weight. Graphite on steel has a coefficient of friction of 0.1 per the Machineries handbook 23 edition.

TABLE 1

Dye system modified with conductive carbon nanotubes embodiment 1.

| Curing time and temperature | Ohms/Sq. | Thermal Conductivity (Watts/meter/Kelvin) | coefficient of friction |
|---|---|---|---|
| Cured for 20 minutes at 95 degrees C. | 450 | 4,700 | 0.15 |
| Cured for 10 minutes at 95 degrees C. | 2,000 | 3,100 | 0.14 |
| Cured for 20 minutes at 70 degrees C. | 11,000 | 50 | 0.14 |
| Cured for 10 minutes at 45 degrees C. | Not conductive | Not conductive | Not tested |

TABLE 2

Dye system modified with conductive carbon nanotubes embodiment 2.

| Curing time and temperature | Ohms/Sq. | Thermal Conductivity (Watts/meter/Kelvin) | coefficient of friction |
|---|---|---|---|
| Cured for 20 minutes at 95 degrees C. | 1,100 | 3,920 | 0.14 |
| Cured for 10 minutes at 95 degrees C. | 3,200 | 2,600 | 0.13 |
| Cured for 20 minutes at 70 degrees C. | 18,000 | 50 | 0.13 |
| Cured for 10 minutes at 45 degrees C. | Not conductive | Not conductive | Not tested |

TABLE 3

Dye system modified with conductive carbon nanotubes embodiment 3.

| Curing time and temperature | Ohms/Sq. | Thermal Conductivity (Watts/meter/Kelvin) | coefficient of friction |
|---|---|---|---|
| Cured for 20 minutes at 95 degrees C. | 1,400 | 3,700 | 0.14 |
| Cured for 10 minutes at 95 degrees C. | 3,600 | 2,200 | 0.13 |
| Cured for 20 minutes at 70 degrees C. | 18,500 | 50 | 0.14 |
| Cured for 10 minutes at 45 degrees C. | not conductive | not conductive | not tested |

TABLE 4

Dye system modified with conductive carbon nanotubes embodiment 4.

| Curing time and temperature | Ohms/Sq. | Thermal Conductivity (Watts/meter/Kelvin) | coefficient of friction |
|---|---|---|---|
| Cured for 20 minutes at 95 degrees C. | 500 | 4,600 | 0.13 |
| Cured for 10 minutes at 95 degrees C. | 2,200 | 3,200 | 0.13 |
| Cured for 20 minutes at 70 degrees C. | 12,000 | 50 | 0.12 |
| Cured for 10 minutes at 45 degrees C. | not conductive | not conductive | not tested |

TABLE 5

Dye system modified with conductive carbon nanotubes embodiment 5.

| Curing time and temperature | Ohms/Sq. | Thermal Conductivity (Watts/meter/Kelvin) | coefficient of friction |
|---|---|---|---|
| Cured for 20 minutes at 95 degrees C. | 1,700 | 3,200 | 0.14 |
| Cured for 10 minutes at 95 degrees C. | 3,100 | 1,900 | 0.13 |
| Cured for 20 minutes at 70 degrees C. | 24,000 | not conductive | 0.21 |
| Cured for 10 minutes at 45 degrees C. | not conductive | not conductive | not tested |

TABLE 6

Dye system modified with conductive carbon nanotubes embodiment 6.

| Curing time and temperature | Ohms/Sq. | Thermal Conductivity (Watts/meter/Kelvin) | coefficient of friction |
|---|---|---|---|
| Cured for 20 minutes at 95 degrees C. | 1,800 | 3,000 | 0.15 |
| Cured for 10 minutes at 95 degrees C. | 3,700 | 2,500 | 0.13 |
| Cured for 20 minutes at 70 degrees C. | 19,000 | 90 | 0.19 |
| Cured for 10 minutes at 45 degrees C. | not conductive | not conductive | not tested |

TABLE 7

Dye system modified with conductive carbon nanotubes embodiment 7.

| Curing time and temperature | Ohms/Sq. | Thermal Conductivity (Watts/meter/Kelvin) | coefficient of friction |
|---|---|---|---|
| Cured for 20 minutes at 95 degrees C. | 900 | 4,200 | 0.16 |
| Cured for 10 minutes at 95 degrees C. | 1,600 | 3,700 | 0.15 |
| Cured for 20 minutes at 70 degrees C. | 7,000 | 1,200 | 0.14 |
| Cured for 10 minutes at 45 degrees C. | 18,000 | 50 | 0.18 |

TABLE 8

Dye system modified with conductive carbon nanotubes embodiment 8.

| Curing time and temperature | Ohms/Sq. | Thermal Conductivity (Watts/meter/Kelvin) | coefficient of friction |
|---|---|---|---|
| Cured for 20 minutes at 95 degrees C. | 350 | 4,800 | 0.16 |
| Cured for 10 minutes at 95 degrees C. | 1,925 | 3,230 | 0.17 |
| Cured for 20 minutes at 70 degrees C. | 13,400 | 240 | 0.17 |

TABLE 8-continued

Dye system modified with conductive carbon nanotubes embodiment 8.

| Curing time and temperature | Ohms/Sq. | Thermal Conductivity (Watts/meter/Kelvin) | coefficient of friction |
|---|---|---|---|
| Cured for 10 minutes at 45 degrees C. | 18500 | 200 | 0.24 |

TABLE 9

Dye system modified with conductive carbon nanotubes embodiment 8.

| Curing time and temperature | Ohms/Sq. | Thermal Conductivity (Watts/meter/Kelvin) | coefficient of friction |
|---|---|---|---|
| Cured for 20 minutes at 95 degrees C. | 320 | 4,750 | 0.17 |
| Cured for 10 minutes at 95 degrees C. | 1,765 | 9,950 | 0.17 |
| Cured for 20 minutes at 70 degrees C. | 12,200 | 210 | 0.17 |
| Cured for 10 minutes at 45 degrees C. | 17450 | 190 | 0.25 |

FIG. 1 is a view of one exemplary grounded fabric armor system in accordance with the invention. A shirt 1 is fabricated by traditional tailoring methods from the material formed by embodiment 1 or embodiment 7. Two ground straps 5 and 10 are then attached to the shirt by bonding the straps 5 and 10 with a conductive epoxy to the back of the inside of the shirt 1. Then the shirt and straps are worn by a person. The person then attaches the lower end of straps 5 and 10 to boots 15 and 20 which are designed with metal grounding inserts shown. This forms the armor system for anti stun gun protection.

A similar uniform comprising jump suit and pants can be fashioned to protect personnel and equipment from static discharge by using fabric from embodiments 1 to 7 and then grounding the uniform through the boots or by a ground strap attached to jump suit.

As will be understood by those skilled in the art, different mixtures of the carbon nanotubes and conductive materials can be assembled to create a conductive dye which when applied to a fabric and properly cured imparts electrical and thermal conductivity to the fabric.

Advantageously, the electrically conductive fibers are present in an amount sufficient so that the fabric can be designed to have a specific resistance.

The fabrics of the invention preferably have a basis weight of about 10 to 140 grams per square meter. The fabrics are advantageously used as a component in products in which conductive properties are desirable, such as a component in carpeting, upholstery, anti static apparel, stun gun armor and the like. For example, the fabrics of the invention may be used as the backing component of a carpet. Further, the fabrics of the invention can be used in medical fabric applications, such as surgical gowns, surgical drapes, sterile wraps, and the like. As will be apparent to the skilled artisan, the basis weight and the amount of electrically conductive of the fabrics depend upon the desired end use of the fabric.

The invention has been described in considerable detail with reference to its preferred embodiments. However, it will be apparent that numerous variations and modifications can be made without departure from the scope of the invention as described in the foregoing specification and defined in the appended claims.

That which is claimed is:

1. A conductive fabric, comprising:
   a plurality of substantially continuous linen fibers; and
   a conductive dye disposed on the linen fibers, the conductive dye comprising,
   a conductive material defined by a dispersion of carbon nanotubes in o-xylene, and;
   a mixture of indigo powder, washing soda, and sodium hydrosulfite;
   wherein the conductive dye is applied to the linen fibers such that the conductive dye is absorbed thereby and imbibed uniformly throughout the plurality of substantially continuous linen fibers such that the conductive material is adhered to the outer diameters of the linen fibers, thereby forming three-dimensional conductive mats around the linen fibers.

2. The conductive fabric of claim 1, wherein the carbon nanotubes have an outer diameter of greater than about 0.5 nm.

3. The conductive fabric of claim 1, wherein the carbon nanotubes have an average outer diameter of less than 30 nanometers.

4. The conductive fabric of claim 1, wherein the carbon nanotubes are suspended in a solvent.

5. The conductive fabric of claim 1, wherein the fabric is formed into anti static clothing.

6. The conductive fabric of claim 1, wherein the fabric provides protection against stun gun devices.

7. The conductive fabric of claim 1, wherein the linen fibers are conductive after dyeing with the conductive dye containing carbon nanotubes and curing at a temperature of at least 45 degrees C. for 20 minutes.

8. The conductive fabric of claim 1, wherein the dye further comprises a plasticizer, softening agent, filler, reinforcing agent, processing aid, stabilizer, antioxidant, dispersing agent, binder, a cross-linking agent, a coloring agent, a UV absorbent agent, or a charge adjusting agent.

9. The conductive fabric of claim 1, wherein the dye further comprises conductive organic materials, inorganic materials, or combinations or mixtures thereof.

10. The conductive fabric of claim 1, further comprising conductors, fluids, gelatins, ionic compounds, semiconductors, solids, surfactants, or combinations or mixtures thereof.

11. The conductive fabric of claim 1, wherein the linen fibers are thermally conductive after dyeing with the conductive dye containing carbon nanotubes and curing at a temperature of at least 45 degrees C. for 20 minutes.

12. The conductive fabric of claim 1, wherein the linen fibers are thermally conductive after dyeing with the conductive dye containing carbon nanotubes and further comprises metal oxides and curing at a temperature of at least 45 degrees C. for 20 minutes.

13. The conductive fabric of claim 1, wherein the linen fibers are thermally conductive after dyeing with the conductive dye containing carbon nanotubes and further comprises metals and curing at a temperature of at least 45 degrees C. for 20 minutes.

14. The conductive fabric of claim 1, wherein the linen fibers are thermally conductive after dyeing with the conductive dye containing carbon nanotubes and further comprises polymers and curing at a temperature of at least 45 degrees C. for 20 minutes.

15. The conductive fabric of claim 1, wherein the linen fibers provide a coefficient of friction of less than about 0.25 after dyeing with the conductive dye containing carbon nanotubes and curing at a temperature of at least 45 degrees C. for 20 minutes.

16. The conductive fabric of claim 1, wherein the linen fibers provide a coefficient of friction of less than about 0.25 after dyeing with the conductive dye containing carbon nanotubes further comprising metal oxides and curing at a temperature of at least 45 degrees C. for 20 minutes.

17. The conductive fabric of claim 1, wherein electrically conductive the linen fibers provides provide a coefficient of friction of less than about 0.25 after dyeing with the conductive dye containing carbon nanotubes and further comprises metals and curing at a temperature of at least 45 degrees C. for 20 minutes.

18. The conductive fabric according to of claim 1, wherein the linen fibers provide a coefficient of friction of less than about 0.25 after dyeing with the conductive dye containing carbon nanotubes and which further comprises polymers and curing at a temperature of at least 45 degrees C. for 20 minutes.

19. The conductive fabric of claim 1, further comprising a polymer mixed with the conductive material.

20. The conductive fabric of claim 1, further comprising a dispersion of antimony tin oxide and a polymer mixed with the conductive material.

21. The conductive fabric of claim 1, wherein the linen fibers are conductive after dyeing with the conductive dye containing carbon nanotubes and which further comprises a conductive material selected from the group consisting of antimony tin oxide, iridium tin oxide, aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and combinations and mixtures thereof and curing at a temperature of at least 45 degrees C. for 20 minutes.

22. The conductive fabric of claim 21, further comprising a conductive component selected from the group consisting of tin-indium mixed oxide, antimony-tin mixed oxide, fluorine-doped tin oxide, aluminum-doped zinc oxide and combinations and mixtures thereof.

23. The conductive fabric of claim 1, wherein the linen fibers are conductive after dyeing with the conductive dye containing carbon nanotubes and further comprises polymeric material and curing at a temperature of at least 45 degrees C. for 20 minutes.

24. The conductive fabric of claim 23, wherein the polymeric material comprises a material selected from the group consisting of thermoplastics, thermosetting polymers, elastomers, conducting polymers and combinations thereof.

25. The conductive fabric of claim 23, wherein the polymeric material comprises a material selected from the group consisting of ceramic hybrid polymers, phosphine oxides, and chalcogenides.

26. The conductive fabric of claim 23, wherein the conductive dye provides the fabric with a coefficient of friction of less than about 0.25 after dyeing and further comprises a polymeric material, wherein the polymeric material comprises a material selected from the group consisting of thermoplastics, thermosetting polymers, elastomers, conducting polymers and combinations thereof.

* * * * *